United States Patent
Smely

(10) Patent No.: US 10,880,923 B2
(45) Date of Patent: Dec. 29, 2020

(54) DEVICE FOR COMMUNICATING ACCORDING TO A FIRST AND SECOND COMMUNICATION STANDARD

(71) Applicant: Kapsch TrafficCom AG, Vienna (AT)

(72) Inventor: Dieter Smely, Schwechat (AT)

(73) Assignee: Kapsch TrafficCom AG, Vienna (AT)

( * ) Notice: Subject to any disclaimer, the term of this patent is extended or adjusted under 35 U.S.C. 154(b) by 0 days.

(21) Appl. No.: 16/429,876

(22) Filed: Jun. 3, 2019

(65) Prior Publication Data

US 2019/0380146 A1   Dec. 12, 2019

(30) Foreign Application Priority Data

Jun. 8, 2018   (EP) ..................................... 18176778

(51) Int. Cl.
*H04W 74/08*   (2009.01)
*H04W 84/04*   (2009.01)
*H04W 84/18*   (2009.01)

(52) U.S. Cl.
CPC ...... *H04W 74/0808* (2013.01); *H04W 84/042* (2013.01); *H04W 84/18* (2013.01)

(58) Field of Classification Search
None
See application file for complete search history.

(56) References Cited

U.S. PATENT DOCUMENTS

| 2015/0250002 A1* | 9/2015 | Sun ................... H04W 74/0808 370/329 |
| 2015/0327297 A1 | 11/2015 | Nilsson et al. |
| 2016/0302179 A1* | 10/2016 | Gupta .................. H04W 74/04 |
| 2017/0055181 A1* | 2/2017 | Tiirola ................. H04L 5/0055 |
| 2017/0280445 A1 | 9/2017 | Jiang et al. |

(Continued)

FOREIGN PATENT DOCUMENTS

| EP | 3038411 A1 | 6/2016 |
| WO | 2017/077034 A1 | 5/2017 |

OTHER PUBLICATIONS

Extended European Search Report received in European Patent Application No. 18176778.1, dated Oct. 11, 2018, 15 pages.

(Continued)

*Primary Examiner* — Saumit Shah
(74) *Attorney, Agent, or Firm* — Fiala & Weaver P.L.L.C.

(57) ABSTRACT

A device is disclosed for communicating according to a first and a second communication standard, the first standard being a standard using carrier-sense multiple access (CSMA) and the second being an LTE standard, the LTE standard comprising a device-to-device functionality, wherein the device communicates according to the first standard as well as according to the second standard in the same frequency channel, broadcasts a channel reservation message in said frequency channel, the channel reservation message indicating a length for communications according to the second standard such that no communications according to the first standard are performed over said length, and communicates according to the second standard over said length indicated in the channel reservation message. A method for communicating according to a first and a second communication standard is also disclosed.

20 Claims, 3 Drawing Sheets

(56) References Cited

U.S. PATENT DOCUMENTS

2018/0077725 A1    3/2018  Sun et al.
2018/0124670 A1    5/2018  Alanen et al.
2019/0320465 A1*  10/2019  Wu .................... H04B 17/318

OTHER PUBLICATIONS

European Office Action issued in Application No. 181767781.1, dated Jun. 15, 2020, 11 pages.

* cited by examiner

DEVICE FOR COMMUNICATING ACCORDING TO A FIRST AND SECOND COMMUNICATION STANDARD

CROSS-REFERENCE TO RELATED APPLICATION(S)

This application claims priority to European Patent Application No. 18 176 778.1, filed on Jun. 8, 2018, the entirety of which is incorporated by reference herein.

TECHNICAL FIELD

The present disclosure relates to a device for communicating according to a first and a second communication standard, the first standard being a standard using carrier-sense multiple access and the second being an Long Term Evolution (LTE) standard, the LTE standard comprising a device-to-device (D2D) functionality.

BACKGROUND ART

In the state of the art—especially in the field of onboard-unit communications of vehicles—onboard-units (or devices in more general cases) communicate safety critical messages as nodes in an ad-hoc network. This can be implemented to warn other vehicles in case of accidents, for example.

Current technologies use existing short range communication standards for such ad-hoc networks, for example the family of IEEE (Institute of Electrical and Electronics Engineers) 802.11 standards (commonly known as WLAN (wireless local area network)), the ETSI EN 302 663 standard, the ITS-G5 standard, or the WAVE DSRC (Wireless Access in Vehicular Environments—Dedicated Short Range Communication) standard. To implement these technologies in the field, the corresponding authorities (i.e., the communication service providers) provide one or more frequency channels over which communications according to said standards are to be performed.

As new technologies are developed, new frequency channels have to be assigned for new types of communication. For example, newer onboard-units communicate with each other by means of the device-to-device (D2D) functionality of Release 14 (or higher) of the LTE (Long Term Evolution) standard. Current solutions to implement both said current and new technologies suggest to provide a different frequency channel for each technology to limit interferences between those two types of communication.

BRIEF SUMMARY

It is an aim of the present patent application to achieve devices and methods that allow two standards to be used at the same time with minimal interferences.

In a first aspect, the present application provides for a device for communicating according to a first and a second communication standard, the first standard being a standard using Carrier-Sense Multiple Access (CSMA) and the second standard being a standard using a synchronous Time Division Multiplex Access (TDMA) and a device-to-device functionality, wherein the device is a node of an ad-hoc network and configured to communicate within said ad-hoc network according to the first standard, and wherein the device is configured to communicate with at least one further device according to the second standard, wherein the device is further configured to communicate according to the first standard as well as according to the second standard in the same frequency channel, broadcast a channel reservation message in said frequency channel, the channel reservation message having a format according to the first standard and indicating at least a length of a communication time slot for communication according to the second standard such that no communications according to the first standard are performed over said length, and to communicate according to the second standard with said at least one further device over said length indicated in the channel reservation message.

The inventive device allows two different types of devices—on one hand the nodes of the ad-hoc network and on the other hand new LTE devices or devices of the same type as the inventive device—to communicate in the same frequency channel. The usage of only one frequency channel alleviates the need for a second frequency channel such that investment costs for the new technologies can be reduced.

In a way, the inventive device acts as a link between the ad-hoc network and the further devices communicating according to the second standard by telling the ad-hoc network when to stop communicating and simultaneously telling the further devices when they can communicate. During said length, the inventive device can communicate according to the second standard itself, i.e., send messages or be open to receptions of messages from the further devices. The device may even send an LTE channel resource allocation message to the further devices at some point during the length.

Furthermore, in contrast to the usage of two frequency channels, the individual distribution of radio resources leads to a more efficient usage of resources because channel resources can be distributed more flexibly. Moreover, the inventive device leads to a high degree of backwards-compatibility for the nodes of the ad-hoc network as well as for the LTE devices because only one of the standards has to be adapted.

The inventive device can be employed in cases where the further devices are only compatible with the second standard, e.g., LTE (i.e., are incapable to communicate according to the first standard) or in which the further devices can all communicate according to the first and the second standard. As such, every further device could have the capabilities and/or authorisation to broadcast a channel reservation message and be configured as an inventive device. In this case measures can be taken to ensure that no two devices send the same channel reservation message.

As such, the further devices could even be part of the ad-hoc network such that there could be a parallel communication between devices all of the same type (supporting both standards) in the same frequency channel with two different standards. In one embodiment, however, the nodes of the ad-hoc network only communicate according to the first standard and the further devices only communicate according to the second standard.

In such cases the channel reservation message can be sent from this inventive device that knows the (LTE) resource distribution, may it be due to receiving this information from a static node (eNB, evolved NodeB) of the (LTE) network or because it generates this information itself. Depending on the configuration, for the communication time slot of the second standard, individual inventive devices can perform the resource distribution for the entire (LTE) resource pool or only for the channel resources distributed to themselves.

In a further embodiment, the channel reservation message further indicates a starting or end point in time for said length, and said starting or end point in time being at a predetermined time after the end of the channel reservation message. In this embodiment, the channel reservation message is a message separate to communication messages according to the first or second standard and serves to tell nodes of the ad-hoc network when exactly in the future the frequency channel will be occupied. This channel reservation message has the advantages that the second standard does not have to be adapted. However, the channel reservation message has to be standardised for the first standard such that the other nodes of the ad-hoc network know when to cease communicating. In this embodiment, the device sending the channel reservation message can also be assigned to distribute channel resources to the further devices.

In the previously mentioned embodiment the channel reservation message may also indicate at least one second length of a communication time slot for communication according to the second standard such that no communications according to the first standard are performed over said length as well as said at least one second length. This serves to tell the ad-hoc network at which two or more times in the future communication is to be ceased. This has the overall advantage that less channel reservation messages have to be broadcast by the device, which in turn reduces channel occupancy.

In an alternative embodiment, said communication time slot lies within the channel reservation message. In this case, the channel reservation message is broadcast over a long time so that the nodes of the ad-hoc network automatically cease communication over the length of time of the communication time slot reserved for second standard communications. This embodiment has the advantage that it works without having to add the existence of a channel reservation message to the first standard, i.e., the channel reservation message is a regular communication message according to the standard but whose data field is still empty to reserve it for second standard communications. Thus, the first standard does not have to be adapted. However, since LTE technology, for example, does not sense the channel before transmitting, there could be still an overlap (interference) with already ongoing ITS-G5 communications.

In this embodiment the channel reservation message may have a preamble field, a signal field, and a data field, and wherein the length information of the communication time slot is indicated in the signal field and is comprised by the data field, i.e., lies in the data field. By means of this, a standard message can be adapted to tell the ad-hoc network in the signal field that communications should be ceased over the data field while simultaneously the further devices are capable to communicate during the data field.

The two aforementioned embodiments can be combined to indicate in a previous (further) channel reservation message that a message will follow in whose data field communications according to the second standard will be performed. A combination of both methods will give full interference protection for new ITS-G5 implementations (that can interpret the further channel reservation message) and a reasonable protection also for legacy devices (that can only interpret the header of the channel reservation message but not the further channel reservation message).

Optionally, the device is configured to broadcast the channel reservation message in said frequency channel. This allows to use only one frequency channel in total. Alternatively, the channel reservation message could also be sent in another frequency channel. This could be the case where there are two or more frequency channels available in total and only one channel reservation message is sent to reserve communication time slots in all frequency channels. For this purpose, the channel reservation message could also contain information about the respective frequency channel.

For the first standard, various short range communication standards that employ the carrier-sense multiple access (CSMA) functionality of the ad-hoc network can be used. Optionally, the first standard is an IEEE 802.11 standard, an ETSI EN 302 663 standard, an ITS-G5 standard, or a WAVE DSRC standard. Variants of ITS-G5, especially other members of the DSRC family, are suited for the first standard, too.

For the second standard, any standard implementing TDMA with a device-to-device functionality can be employed. Optionally, the second standard is Release 14 (or higher) of LTE. Other variants of LTE that optionally incorporate LTE-V2X (Vehicle to Everything) are suited, too. Furthermore, other 4G, 5G, etc. standards with TDMA and a device-to-device functionality could be employed, too.

In a second aspect, a method for communicating according to a first and a second communication standard by means of a device is provided, the first standard being a standard using Carrier-Sense Multiple Access and the second standard being a standard using a synchronous Time Division Multiplex Access and a device-to-device functionality, wherein the device is a node of an ad-hoc network and communicates within said ad-hoc network according to the first standard, and wherein the device communicates with at least one further device according to the second standard, the method being characterised by the following steps performed in the device:

communicating according to the first standard as well as according to the second standard in the same frequency channel, broadcasting a channel reservation message in said frequency channel, the channel reservation message having a format according to the first standard and indicating at least a length of a communication time slot for communication according to the second standard such that no communications according to the first standard are performed over said length; and communicating according to the second standard with said further devices over said length indicated in the channel reservation message.

The inventive method may have the same optional features as described above for the inventive device and brings about the same advantages.

BRIEF DESCRIPTION OF THE DRAWINGS/FIGURES

Embodiments shall now be explained in more detail below on the basis of exemplary embodiments thereof with reference to the accompanying drawings, in which:

FIG. 1 shows a schematic top view of a road on which vehicles with devices travel;

FIGS. 2 and 3 each show a diagram in which the channel occupancy is depicted over time in a first embodiment;

DETAILED DESCRIPTION

Figure 1:
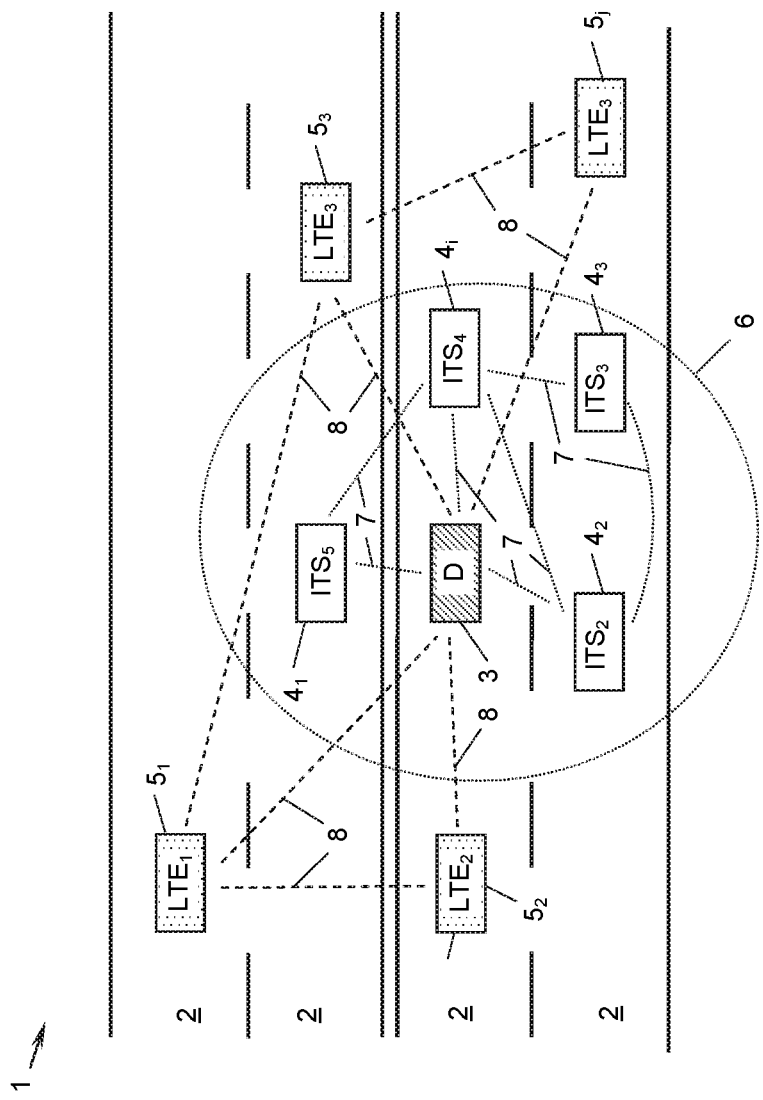

FIG. 1 shows a road system 1 with a multitude of lanes 2, on which vehicles (not shown) carrying different types of communication devices 3, 4, (i=1, 2, ... ), $5_j$ (j=1, 2, ... ) travel.

The first type of devices 4, are nodes of an ad-hoc network 6, which all communicate messages 7 (in general "communications 7") according to a first standard with each other. When used with devices 3, 4, in vehicles, the ad-hoc network 6 may be a VANET (Vehicular Ad-hoc Network). The ad-hoc network 6 is of such a type that communication resources are not pre-distributed for its nodes 4, such that nodes 4, can join and leave the ad-hoc network 6 at will.

To avoid collisions of messages of the nodes 4, of the ad-hoc network 6, the first standard has carrier-sense multiple access (CSMA) implemented. CSMA can also be implemented in a variant thereof, for example with collision avoidance (CSMA/CA) or there like. For example, the family of IEEE 802.11 standards ("WLAN"), the ETSI (European Telecommunications Standard Institute) EN 302 663 standard, the ITS-G5 (Intelligent Transport System) standard, or the WAVE (Wireless Access in Vehicular Environments) DSRC (Dedicated Short Range Communication) standard can be used as the first standard. Of those, ITS-G5 and WAVE DSRC are both based on the IEEE 802.11p standard. Other short range communication standards, for example based on DSRC, can be employed as the first standard too, for example CEN standards.

The nodes 4, of the ad-hoc network 6 are already deployed in practice. However, such ad-hoc networks 6 are partially outdated and there is a need for new communication devices $5_j$ with a higher throughput. For this reason, some vehicles carry devices $5_j$ (here also called "further" devices) that directly (i.e., not via a node) communicate messages 8 (in general "communications 8") with each other according to a second standard. This standard is, for example, a Long Term Evolution (LTE) standard comprising a device-to-device (D2D) functionality, for example, Release 14 (or higher) of LTE. Generally, the second standard uses a synchronous Time Division Multiple Access (TDMA) with a device-to-device functionality and is thus not restricted to LTE but can be of a 4G, 5G, ... type.

In the method described herein, communications 8 between the further devices 5, are effected directly between the further devices $5_j$ (and the device 3 respectively, see below) by means of said device-to-device functionality, i.e., not via a node of the LTE system.

So as not to interfere with the communications 7 of the ad-hoc network 6, in the state of the art the further devices $5_j$ had to use different frequency channels for their communications 8. Conventionally, the nodes 4, of the ad-hoc network 6 would thus communicate in one frequency channel and the further devices $5_j$ in another frequency channel. For example, for ITS-G5 service in Europe, five 10 MHz frequency channels are assigned, while different frequency channels are assigned for LTE service.

Figure 2:
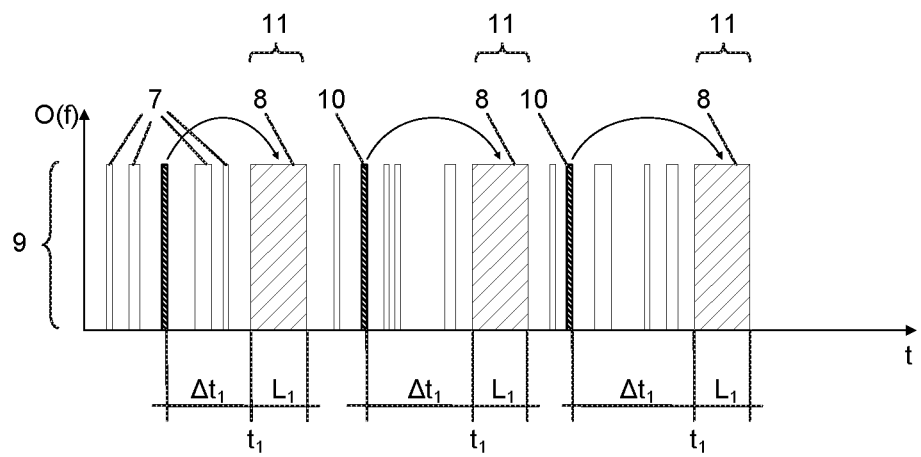
Figure 3:
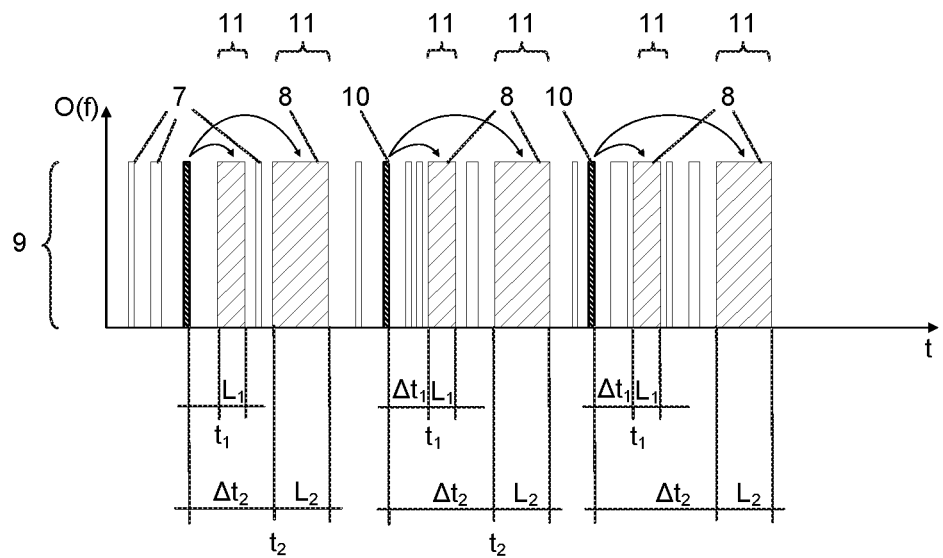
Figure 4:
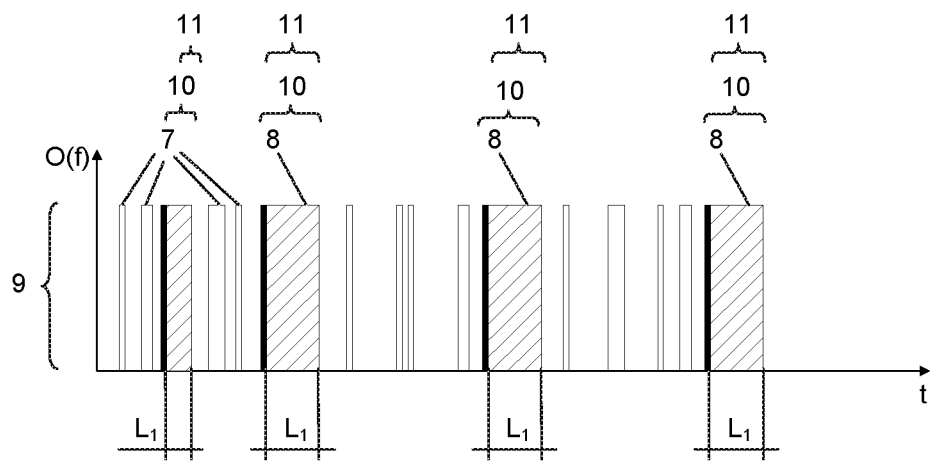
FIG. 4 shows a diagram in which the channel occupancy is depicted over time in a second inventive embodiment.

To allow the nodes 4, of the ad-hoc network 6 and the further devices 5 to communicate in the same frequency channel 9 (FIG. 2), for example around 5.9 GHz, the device 3 is provided which can communicate both according to the first and the second communication standard. As shown in FIGS. 2 to 4, the device 3 will broadcast a channel reservation message 10 in said frequency channel 9 to inform the nodes 4, of the ad-hoc network 6 when not to communicate and simultaneously provide this information to the further devices $5_j$ such that the further devices $5_j$ know when the communication channel 9 is not occupied by communications 7 of the ad-hoc network 6.

To this end, the channel reservation message 10 has a format according to the first standard and indicates at least a length $L_1$ of a communication time slot 11 for communications 8 according to the second standard such that no other communications 7 according to the first standard are performed over said length $L_1$. Once the device 3 has broadcast the channel reservation message 10, the device 3 can communicate according to the second standard with the further devices $5_j$ over said length $L_1$ indicated in the channel reservation message 10. The length $L_1$ could be indicated as a duration in time, as a bit or byte length, a data rate, or the like. Depending on the embodiment (see below), the length could also be indicated as a starting and end point in time or bit/byte.

Turning to FIG. 2, a first embodiment is shown, in which the channel reservation message 10 indicates a starting point in time $t_1$ for said length $L_1$, said starting point in time $t_1$ starting at a predetermined time interval $\Delta t_1$ after the end of the channel reservation message 10. Thus, instead of the time $t_1$, the time interval $\Delta t_1$ could be indicated in the channel reservation message 10. By means of this, an intended communication 8 according to the second standard that lies in the future can be announced to the ad-hoc network 6. For indicating the length and starting point, various representations could be chosen. For example, the channel reservation message 10 could indicate a starting point and an end point in time through which the length is implicitly defined.

As timing of communication resources blocks of LTE for the communications 8 is usually predetermined by a time synchronisation between the device 3 and the further devices $5_j$, the length $L_1$ indicated in the channel reservation message 10 is chosen to start at the beginning or just before such an LTE resource block and ends with the end or just after a different LTE resource block to maximise throughput for the device 3 and the further devices $5_j$.

As shown in FIG. 3 the channel reservation message 10 can also include a second length $L_2$ (and corresponding starting time $t_2$ or time interval $\Delta t_2$) of a second communication time slot 11 for communications 8 according to the second standard such that no communications 7 according to the first standard are performed over said length $L_1$ as well as said second length $L_2$. Generally, also more than two communication time slots 11 can be indicated in the channel reservation message 10. Instead of having one channel reservation message 10 for each LTE communication 8 as in FIG. 2, now only one channel reservation message 10 has to be used for multiple LTE communications 8. The time between channel reservation messages 10 can in principle be chosen freely, however, it is useful to adapt the time between channel reservation messages 10 according to a communication period of the ad-hoc network 6 that is encoded in the CSMA functionality.

In the embodiments of FIGS. 2 and 3, the channel reservation message 10 can either be sent separately, in which case it can be equipped with an appropriate authentication mechanism, or it can be a part of an already standardised message, for example a Common Awareness Message (CAM), which is already equipped with an authentication mechanism. Depending on the embodiment and implementation, software of other nodes 4, of the ad-hoc network 6 may need to be updated so that they can identify and/or interpret the channel reservation message 10.

FIG. 4 shows a different embodiment, in which the communication time slot 11 of said length $L_1$ lies "within" the channel reservation message 10. This results in a "long" channel reservation message 10, which the other nodes 4, of the ad-hoc network 6 simply interpret as a long communication and thus stop communicating during said channel reservation message 10, which in turn allows the further devices $5_j$ to communicate in the time slot occurring as a "gap" during the emission of the channel reservation message 10.

In contrast to the embodiments of FIGS. 2 and 3, in the embodiment of FIG. 4 the channel reservation message is thus not a "pointer" to a future length of time $t_1$ in which communications in the ad-hoc network 6 are to be ceased but directly "overspans" this length of time $t_1$ as a placeholder for LTE communications 8. This has the advantage that the existing ad-hoc network 6 does not have to be changed in the slightest, and especially the existence of a channel reservation message 10 does not have to be postulated to the individual nodes 4, that already roam on the road system 1.

Figure 5:
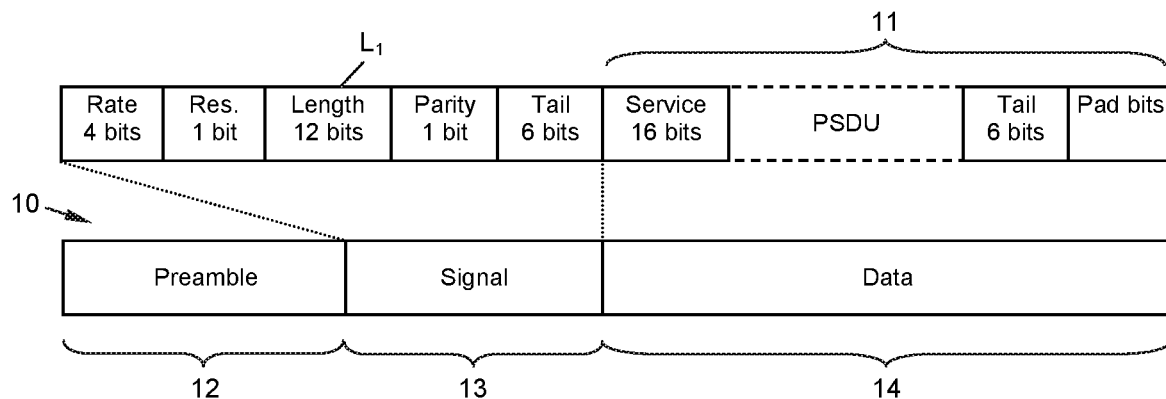
FIG. 5 shows the data structure of an ITS-G5 message.

FIG. 5 shows in detail the construction of such a channel reservation message 10. According to most short range communication standards such as the ITS-G5 standard, communication messages have a preamble field 12, a signal field 13 and a data field 14. The signal field 13 contains length information $L_1$ corresponding to the length $L_1$ of the data field 14. Thus, after one of the nodes 4, has identified the length $L_1$ from the signal field 13, they will cease to communicate over the length $L_1$ of the communication time slot 11 in the data field 14. In turn, the further devices $5_j$ can communicate during the data field 14 of the channel reservation message 10 without experiencing interferences from the ad-hoc network 6.

As is shown in FIG. 5, in addition to the length information $L_1$ in the signal field 13, furthermore also a rate information, a reserved information placeholder, parity information and tail information are included in the signal field 13. The preamble field 12 is used for synchronising the devices $4_i$. The data field 14 has a Physical Layer Service Data Unit (PSDU) enclosed by service information, tail information and pad bits. During the PSDU or alternatively over the whole data field 14, the device 3 can communicate according to the second standard itself, i.e., send messages or be open to receptions of messages from the further devices $5_j$.

Figure 6:
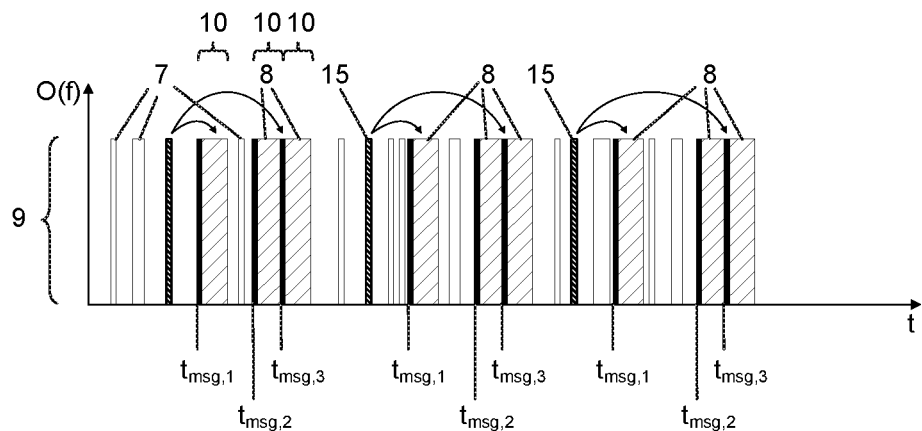
FIG. 6 shows a diagram in which the channel occupancy is depicted over time according to a third inventive embodiment.

FIG. 6 shows an embodiment in which the advantages of the embodiments of FIGS. 3 and 4 are combined. To this end, the device 3 broadcasts a further channel reservation message 15 before broadcasting the channel reservation message 10. In this case, the further channel reservation message 15 indicates the starting times $t_{msg,1}, t_{msg,2}, t_{msg,3}$ of three channel reservation messages 10 that each have a length $L_1, L_2, L_3$ indicated in the signal field 13, which length $L_1, L_2, L_3$ is in turn comprised by the data field 14 of the respective channel reservation message 10. Optionally, the further channel reservation message 15 already indicates the lengths $L_1, L_2, L_3$ that the channel reservation message 10 will comprise, which allows for better planning and distribution of resources.

Usually, the device 3 allocates the resources or resource blocks among the further devices $5_j$. In such embodiments, the device 3 acts as a master device for the further LTE devices $5_j$. For this, the device 3 knows the resource distribution, e.g., due to information received from a fixed base station (eNB, evolved NodeB according to LTE) or because it allocates resources itself. In other embodiments, all further devices $5_j$ have the same functionality as the device 3, e.g., each further device $5_j$ has the capability and/or authority to broadcast a channel reservation message 10 in said frequency channel 9. In this case it can be made sure that channel reservation messages 10 are not sent twice, i.e., no two devices 3 broadcast the same channel reservation message 10. In such cases, it is possible that each device 3 or further device $5_j$ only communicates over a length $L_1$ indicated in its own channel reservation message 10.

In the previously shown embodiments, the channel reservation message 10 was sent in the frequency channel 9 in which also the communication time slot 11 was reserved. Alternatively, the channel reservation message 10 could also be sent in another frequency channel. For example, when two or more frequency channels are available, only one channel reservation message 10 has to be sent to reserve communication time slots 11 in multiple frequency channels. To facilitate this, the channel reservation message 10 could also contain information about the respective frequency channel 9 in which the channel reservation message 10 is to be reserved.

CONCLUSION

Embodiments are not restricted to the specific embodiments described in detail herein, but encompasses all variants, combinations and modifications thereof that fall within the framework of the appended claims.

What is claimed is:

1. A device for communicating according to a first and a second communication standard,
   the first standard being a standard using Carrier-Sense Multiple Access and the second standard being a standard using a synchronous Time Division Multiplex Access and a device-to-device functionality,
   wherein the device is a node of an ad-hoc network and configured to communicate within said ad-hoc network according to the first standard, and
   wherein the device is configured to communicate with at least one further device according to the second standard, and
   wherein the device is further configured to
      communicate according to the first standard as well as according to the second standard in the same frequency channel,
      broadcast a channel reservation message having a format according to the first standard and indicating at least a length of a communication time slot for communications according to the second standard such that no communications according to the first standard are performed over said length, and
      communicate according to the second standard with said at least one further device over said length indicated in the channel reservation message, wherein the channel reservation message further indicates a starting point in time for said length, and said starting point in time being at a predetermined time interval after the end of the channel reservation message.

2. The device according to claim 1, wherein the channel reservation message is equipped with an authentication mechanism or is part of a standardized Common Awareness Message.

3. The device according to claim 1, wherein the channel reservation message also indicates at least one second length of a communication time slot for communications according to the second standard such that no communications according to the first standard are performed over said length as well as said at least one second length.

4. The device according to claim 1, wherein the device is configured to broadcast the channel reservation message before broadcasting at least one further channel reservation message to indicate the starting time of said further channel reservation message, and wherein the communication time slot of said further channel reservation message lies within said further channel reservation message.

5. The device according to claim 4, wherein the further channel reservation message has a preamble field, a signal field, and a data field, and wherein the length is indicated in the signal field and is comprised by the data field.

6. The device according to claim 1, wherein the device is configured to broadcast the channel reservation message in said frequency channel.

7. The device according to claim 1, wherein the first standard is an IEEE (Institute of Electrical and Electronics Engineers) 802.11 standard, an ETSI (European Telecommunications Standard Institute) EN 302 663 standard, an ITS-G5 (Intelligent Transport System) standard, or a WAVE DSRC (Wireless Access in Vehicular Environments-Dedicated Short Range Communication) standard.

8. The device according to claim 1, wherein the second standard is Release 14 or higher of LTE (Long Term Evolution).

9. A method for communicating according to a first and a second communication standard by means of a device,
the first standard being a standard using Carrier-Sense Multiple Access and the second standard being a standard using a synchronous Time Division Multiplex Access and a device-to-device functionality,
wherein the device is a node of an ad-hoc network and communicates within said ad-hoc network according to the first standard, and
wherein the device communicates with at least one further device according to the second standard,
the method comprising the following steps performed in the device:
communicating according to the first standard as well as according to the second standard in the same frequency channel;
broadcasting a channel reservation message in said frequency channel, the channel reservation message having a format according to the first standard and indicating at least a length of a communication time slot for communications according to the second standard such that no communications according to the first standard are performed over said length; and
communicating according to the second standard with said at least one further device over said length indicated in the channel reservation message;
wherein the channel reservation message further indicates a starting point in time for said length, and said starting point in time being at a predetermined time interval after the end of the channel reservation message.

10. The method according to claim 9, wherein the channel reservation message is equipped with an authentication mechanism or is a part of a standardised Common Awareness Message.

11. The method according to claim 9, wherein the channel reservation message also indicates at least one second length of a communication time slot for communications according to the second standard such that no communications according to the first standard are performed over said length as well as said at least one second length.

12. The method according to claim 9, wherein the device broadcasts the channel reservation message before broadcasting at least one further channel reservation message to indicate the starting time of said further channel reservation message, and wherein the communication time slot of said further channel reservation message lies within said further channel reservation message.

13. The method according to claim 12, wherein the channel reservation message has a preamble field, a signal field, and a data field, and wherein the length is indicated in the signal field and is comprised by the data field.

14. The method according to claim 9, wherein the device broadcasts the channel reservation message in said frequency channel.

15. The method according to claim 9, wherein the first standard is an IEEE (Institute of Electrical and Electronics Engineers) 802.11 standard, an ETSI (European Telecommunications Standard Institute) EN 302 663 standard, an ITS-G5 (Intelligent Transport System) standard, or a WAVE DSRC (Wireless Access in Vehicular Environments-Dedicated Short Range Communication) standard.

16. A device for communicating according to a first and a second communication standard,
the first standard being a standard using Carrier-Sense Multiple Access and the second standard being a standard using a synchronous Time Division Multiplex Access and a device-to-device functionality,
wherein the device is a node of an ad-hoc network and configured to communicate within said ad-hoc network according to the first standard, and
wherein the device is configured to communicate with at least one further device according to the second standard, and
wherein the device is further configured to
communicate according to the first standard as well as according to the second standard in the same frequency channel,
broadcast a channel reservation message and a further channel reservation message, the channel reservation message broadcast before the further channel reservation message and indicating a starting time of the further channel reservation message, the further channel reservation message having a format according to the first standard and indicating at least a length of a communication time slot for communications according to the second standard such that no communications according to the first standard are performed over said length, wherein said communication time slot lies within the further channel reservation message, and
communicate according to the second standard with said at least one further device over said length indicated in the further channel reservation message.

17. The device according to claim 16, wherein the first standard is an IEEE (Institute of Electrical and Electronics Engineers) 802.11 standard, an ETSI (European Telecommunications Standard Institute) EN 302 663 standard, an ITS-G5 (Intelligent Transport System) standard, or a WAVE DSRC (Wireless Access in Vehicular Environments-Dedicated Short Range Communication) standard.

18. The device according to claim 16, wherein the second standard is Release 14 or higher of LTE (Long Term Evolution).

19. A method for communicating according to a first and a second communication standard by means of a device,
the first standard being a standard using Carrier-Sense Multiple Access and the second standard being a standard using a synchronous Time Division Multiplex Access and a device-to-device functionality,
wherein the device is a node of an ad-hoc network and communicates within said ad-hoc network according to the first standard, and
wherein the device communicates with at least one further device according to the second standard,
the method comprising the following steps performed in the device:
communicating according to the first standard as well as according to the second standard in the same frequency channel;
broadcasting a channel reservation message and a further channel reservation message in said frequency channel, the channel reservation message broadcast before the further channel reservation message to indicate a starting time of the further channel reservation message, the further channel reservation message having a format according to the first standard and indicating at least a length of a communication time slot for communications according to the second standard such that no communications according to the first standard are performed over said length, wherein said communication time slot lies within the further channel reservation message; and
communicating according to the second standard with said at least one further device over said length indicated in the channel reservation message.

20. The method according to claim 19, wherein the channel reservation message has a preamble field, a signal field, and a data field, and wherein the length is indicated in the signal field and is comprised by the data field.

\* \* \* \* \*